United States Patent
deVries et al.

(10) Patent No.: US 6,495,177 B1
(45) Date of Patent: Dec. 17, 2002

(54) ORALLY DISSOLVABLE NUTRITIONAL SUPPLEMENT

(75) Inventors: Tina deVries, Long Valley, NJ (US); William Valentine, Lawrenceville, GA (US); William K. Valentine, Lawrenceville, GA (US)

(73) Assignee: Warner Chilcott Laboratories Ireland Limited, Dublin (IE)

( * ) Notice: Subject to any disclaimer, the term of this patent is extended or adjusted under 35 U.S.C. 154(b) by 0 days.

(21) Appl. No.: 09/539,850

(22) Filed: Mar. 31, 2000

Related U.S. Application Data

(60) Provisional application No. 60/148,803, filed on Aug. 13, 1999, and provisional application No. 60/148,806, filed on Aug. 13, 1999.

(51) Int. Cl.$^7$ .......................... A23L 1/302; A23L 1/304
(52) U.S. Cl. ............................. 426/72; 426/73; 426/74; 426/285; 424/439; 424/441; 424/464; 424/465
(58) Field of Search .......................... 426/72–74, 285; 424/439

(56) References Cited

U.S. PATENT DOCUMENTS

| | | | | |
|---|---|---|---|---|
| 3,873,713 A | * | 3/1975 | Haas ........................ | 424/280 |
| 3,992,556 A | * | 11/1976 | Kovacs et al. ............. | 426/72 |
| 4,327,076 A | * | 4/1982 | Puglia ........................ | 424/38 |
| 4,327,077 A | * | 4/1982 | Puglia ........................ | 424/38 |
| 4,431,634 A | * | 2/1984 | Ellenbogen ................. | 424/147 |
| 4,582,709 A | * | 4/1986 | Peters et al. ................ | 426/74 |
| 4,684,534 A | * | 8/1987 | Valentine .................... | 427/3 |
| 4,752,479 A | * | 6/1988 | Briggs et al. ............... | 424/472 |
| 4,786,518 A | * | 11/1988 | Nakel ......................... | 426/531 |
| 4,867,989 A | * | 9/1989 | Silva et al. ................. | 426/5 |
| 4,945,083 A | * | 7/1990 | Jansen, Jr. .................. | 514/52 |
| 5,061,815 A | * | 10/1991 | Leu ............................ | 426/74 |
| 5,424,064 A | * | 6/1995 | Schmidt et al. ............ | 424/78.37 |
| 5,569,447 A | * | 10/1996 | Newbitt ....................... | 426/5 |
| 5,637,313 A | * | 6/1997 | Chau et al. ................. | 424/440 |
| 5,686,107 A | * | 11/1997 | Ratnaraj et al. ............ | 424/464 |
| 5,869,084 A | * | 2/1999 | Paradissis et al. .......... | 426/73 |

* cited by examiner

*Primary Examiner*—Carolyn Paden
(74) *Attorney, Agent, or Firm*—Akin, Gump, Strauss, Hauer & Feld, L.L.P.

(57) ABSTRACT

The present invention provides an orally administrable nutritional supplement which is highly palatable, such as a chewable prenatal vitamin/mineral supplement. The supplement is preferably made in the form of a tablet that, upon chewing, dissolves rapidly in the mouth. The tablet is particularly suitable for administration of vitamins and minerals to women during pregnancy. The invention also includes methods of making and using such supplements.

29 Claims, No Drawings

ORALLY DISSOLVABLE NUTRITIONAL SUPPLEMENT

CROSS-REFERENCE TO RELATED APPLICATIONS

This application is entitled to priority pursuant to 35 U.S.C. §119(e) to U.S. provisional patent application Nos. 60/148,803 and 60/148,806, both of which were filed on Aug. 13, 1999.

FIELD OF THE INVENTION

The present invention relates to chewable prenatal vitamin and mineral supplements that dissolve rapidly in the mouth.

BACKGROUND OF THE INVENTION

Vitamin, multi-vitamin and/or mineral preparations are commonly administered to inhibit, to prevent, or to reduce the frequency or severity of (i.e. "to alleviate") specific medical disorders. Such preparations are also used as nutritional supplements. Pregnant women, in particular, are known to require significant dietary supplementation with iron, vitamins (e.g. folic acid), and non-ferrous minerals in order to minimize the risk of birth deformities in the fetus, to improve the chances of a successful delivery, and to improve birth weight of the fetus. Pregnant and lactating women commonly require iron- and vitamin-therapy to alleviate iron-deficiency anemia, and prenatal vitamin/mineral supplements are routinely prescribed for this purpose. Indeed, various patents are directed to improving the efficacy of iron supplementation for use during pregnancy.

Chewable multi-vitamin supplements are well known in the nutritional products industry. These vitamin-containing products typically provide a nutritious and bioavailable product and possess generally good palatability, or organoleptic effect. Developers of chewable nutritional supplements continually strive to develop chewable products having improved mouth feel and enhanced taste. This has been attempted in prior art products by adding taste masking agents or flavor enhancing agents (e.g. ethylmaltol) to the chewable tablet. Generally, however, the more vitamins and minerals a product contains, the less palatable it is, and substantially all of the prior art chewable multi-vitamin products have an unacceptable taste or mouth feel for one or more reasons.

A significant shortcoming of prior art chewable vitamin formulations (including prior art chewable prenatal vitamin/mineral supplements) is their inability to provide certain nutrients (e.g. iron and B vitamins) in a form that both is palatable and provides a nutritionally relevant amount of the nutrient(s) (e.g. the recommended daily allowance {R.D.A.} of the nutrient, as set forth by the U.S. Food and Drug Administration {F.D.A.} Center for Food Safety and Applied Nutrition). Numerous nutrients (iron, for example) have tastes which many individuals find to be disagreeable. Apart from the taste of a chewable nutritional supplement, the 'mouth-feel' of the supplement must also be taken into account. 'Mouth-feel' is a concept that encompasses non-taste-related aspects of the pleasantness experienced by a person while chewing or swallowing an nutritional supplement. Aspects of mouth-feel include, for example, the hardness and brittleness of a composition, whether the composition is chewy, gritty, oily, creamy, watery, sticky, easily dissolved, astringent, effervescent, and the like, and the size, shape, and form (tablet, powder, gel, etc.) of the composition.

Chewable dosage forms of a medication (e.g. chewable prenatal vitamin/mineral supplements) can be easily self-administered, and such dosage forms can be preferred when the likelihood of patient non-compliance with a dosing schedule of the medication is anticipated to be significant, such as when the consequence of failing to adhere to the schedule is not immediately apparent to the patient. For example, a woman may not realize or appreciate that failure to maintain proper nutrition in the early stages of pregnancy, and even prior to becoming pregnant, can significantly increase the risk of birth defects (e.g. failure to maintain a proper level of folate in the diet can increase the risk of neural tube-related birth defects). Side effects associated with an active ingredient in the medication (e.g. gastrointestinal discomfort associated with administration of iron in nutritional supplements) can further reduce patient compliance. Enhanced palatability of a chewable vitamin preparation (e.g. chewable prenatal vitamin/mineral tablets) can enhance patient compliance with a schedule of vitamin administration recommended by a medical practitioner for alleviation of a disease or disorder.

Even when patient compliance is not necessarily required for alleviation of a disease or disorder, differences in the palatability of vitamin preparations (particularly including chewable preparations) can strongly influence an individual's selection of one product from a multitude of available products.

The shortcomings of prior art chewable vitamin supplements have been recognized, but have not been satisfactorily overcome. Some prior art compositions, for example, have avoided unpleasant taste issues by omitting bad-tasting nutrients from the composition. Of course, where the bad-tasting nutrient is a nutrient which is intended to be administered as a part of the composition (e.g. iron and folic acid in a prenatal vitamin supplement), this option is not available. In other prior art compositions, manufacturers have attempted to mask the unpleasant taste of some nutrients. Taste masking technology for the preparation of multi-vitamin tablets can involve encapsulation of one or more nutrients, or addition of sugars, sweeteners, flavoring agents, or some combination of these, to the vitamin-containing composition before it is formulated into a tablet. A shortcoming of taste masking technology, particularly with regard to chewable formulations, is that very small quantities of bad-tasting nutrients can be detected by human taste buds. Thus, the amounts of sugars, sweeteners, and flavoring agents that would be necessary to render the taste of a nutrient undetectable would often be so great that the composition would be rendered unpalatable by these agents. Furthermore, coatings can break down or fail in the compressive, abrasive, and solution conditions which exist in the human mouth during mastication, and such breakdown or failure can lead to release of a taste-detectable amount of nutrient.

A need exists for vitamin-containing nutritional supplements, particularly those amenable for pre- and post-natal use in women, which are in a chewable form, but which do not exhibit the taste- and mouth feel-related shortcomings of prior art chewable vitamin formulations.

Examples of commercially available prenatal multivitamin tablets include PRENATAL-S™, STUART PRENATALS™, THERAGENERIX-M™, NATURE MADE LABS PRENATAL VITAMINS™, BEK™, ZENATE™, ZETAVITE™, NATABEC-RX™, CHENATAL™, ENFAMIL NATALINS™, PRENATAL S™, PRENAVITE™, FEMNATAL™, MATERNA™, PRENAKARE™, PRENATAL "1+1", PRENATE 90™, PRENATE ULTRA™, and PRENATIN-F™, among others.

Simethicone (dimethyl polysiloxane) is an agent which is used for treatment of upset stomach, bloating, gastritis, and flatulence. Simethicone acts as a gastric de-foaming agent to decrease stomach gas. It is often included in antacid products and is available in both liquid and solid dosage forms. Commercially available chewable tablet dosage forms of simethicone include GAS RELIEF™, GAS-X™, GENASYME™, MAJOR-CON™, MI-ACID™, and PHAZYME™. When used in preparation of oral tablet formulations, simethicone is ordinarily used in the form of a granular solid in order to facilitate distribution of the anti-gas agent.

Simethicone has also been used as a pharmaceutical excipient in topical formulations such as ointments and skin protectants.

U.S. Pat. No. 4,710,387 to Uiterwaal et al. discloses a nutritional supplement preparation for pregnant and breast-feeding women which contains 10–20% by weight protein, 16–28% by weight fat, 43–65% by weight carbohydrates, and at most 3.5% by weight moisture, minerals, trace elements, and vitamins.

U.S. Pat. No. 5,869,084 to Paradissis et al. discloses a group of multi-vitamin and mineral supplements for women which are designed to meet the nutritional requirements for women at the various stages of their lives.

U.S. Pat. No. 5,494,678 to Paradissis et al. discloses a group of multi-vitamin and mineral supplements for pregnant women which are designed to maximize fetal development and maternal health during each trimester of pregnancy.

U.S. Pat. No. 4,684,534 to Valentine discloses a quick-liquefying chewable tablet which resists absorption of moisture but quickly liquefies and melts in the mouth once it has been chewed. This tablet is highly palatable, contains a carbohydrate-based agglomerate, and can contain vitamins.

U.S. Pat. Nos. 5,073,384 and 5,275,822 to Valentine et al. disclose granular solid combinates of simethicone USP and a carbohydrate-based agglomerate, for use as a consumable anti-gas and anti-flatulent pharmaceutical preparation.

U.S. Pat. No. 4,725,427 to Ashmead et al. discloses an effervescent vitamin-mineral granule preparation which is designed to be dissolved in water or another liquid to provide a nutritional and tasteful beverage.

While numerous chewable multi-vitamin and mineral supplements are known, none of the prior art supplements adequately overcomes the taste and mouth feel shortcomings which have been described above. The present invention provides nutritional supplements, including prenatal supplements, which do not have the taste and mouth feel shortcomings of the prior art compositions.

SUMMARY OF THE INVENTION

The invention relates to a highly palatable, prenatal nutritional supplement in a chewable form which comprises a prenatally relevant amount of at least one vitamin or mineral and an alkyl polysiloxane. Preferably, the supplement is a chewable tablet. The invention includes supplements which include folic acid, an iron compound, or both of these, as well as those which also include other vitamins or minerals. By way of example, a folic acid-containing supplement can be made for administration to women who are pregnant or who anticipate becoming pregnant. In one embodiment, the invention includes a chewable prenatal dosage form which comprises a prenatally relevant combinate of vitamins and minerals and an alkyl polysiloxane, this embodiment being intended for use as a prenatal nutritional supplement. A supplement that contains one or more iron compounds (e.g. a rapidly dissolving iron compound, a slowly dissolving iron compound, or both) can be made for administration to people afflicted with or at risk for developing a disease or disorder afflicted with iron deficiency (e.g. anemia in pregnant or lactating women). When the supplement contains iron, it preferably does not also contain a therapeutic amount of calcium (and more preferably is substantially free of calcium), owing to interference of calcium with iron uptake.

The highly palatable nature of the supplement provided herein lends itself to preparation of various unit dosage forms, such as chewable tablets and orally administrable powders and granulated preparations. In one aspect of the invention, the unit dosage form is a chewable tablet which comprises (a) about 0.1–2.0 milligrams of folic acid, or a pharmaceutically acceptable salt form thereof (preferably at least about 1.0 milligram; e.g. about 1.25 milligrams);

(b) about 100–800 International Units (I.U.) of vitamin $D_3$ (preferably at least about 400 I.U.; e.g. about 440 I.U.);

(c) about 100–4000 or 100–2000 I.U. of beta carotene (or another pharmaceutically acceptable form of vitamin A, such as vitamin A acetate; preferably the unit dosage form comprises at least about 1000 I.U.; e.g. about 1100 I.U. of vitamin A);

(d) about 0.2–8 milligrams of vitamin $B_1$ (preferably at least about 2 milligrams; e.g. about 2.4 milligrams);

(e) about 0.5–10 milligrams of vitamin $B_2$ (preferably at least about 3 milligrams; e.g. about 3.5 milligrams);

(f) about 2–200 or 2–20 milligrams of vitamin $B_6$ (preferably at least about 10 milligrams; e.g. about 12 milligrams);

(g) about 2–20 micrograms of vitamin $B_{12}$ (preferably at least about 12 milligrams; e.g. about 14.4 milligrams);

(h) about 1–200 or 1–20 I.U. of vitamin E (preferably at least about 11 I.U.; e.g. about 13.2 I.U.);

(i) about 20–200 milligrams of vitamin C in the form of ascorbic acid and/or a pharmaceutically acceptable salt thereof (preferably at least about 120 milligrams; e.g. about 132 milligrams);

(j) about 5–40 milligrams of niacinamide or an equivalent molar amount of niacin (preferably at least about 20 milligrams of niacinamide; e.g. about 22 milligrams);

(k) about 1–100 milligrams of elemental iron in the form of a pharmaceutically acceptable iron compound (preferably at least about 15 milligrams; e.g. about 15, 30, 45, 60, or 90 milligrams).

The amount of alkyl polysiloxane present in the chewable supplement is preferably an amount sufficient to enhance the texture of the supplement, an amount sufficient to improve the mouth feel of the supplement, or both. The alkyl polysiloxane is preferably dimethyl polysiloxane (e.g. simethicone USP, preferably in a granulated form). When the alkyl polysiloxane is present as simethicone, the supplement preferably comprises about 1–100 milligrams of simethicone, and preferably 8–40 milligrams (more preferably 8–15 milligrams). For example, contemplated formulations include formulations which include about 12 or 40 milligrams of simethicone in a unit dose of the supplement (i.e. the amount anticipated to be administered to a human in the course of about 24 hours).

The chewable prenatal supplement described herein can comprise a chewable tablet base, such as a base which comprises one of mannitol, sucrose, sorbitol, dextrose, compressible cellulose, compressible honey, compressible molasses, compressible sugar, and lactose as a primary ingredient. As described herein, such supplements can be prepared in a form which has an interior that is noticeably softer than its exterior. By way of example, the base can comprise an agglomerate which comprises 90–99% by weight of carbohydrate-based material selected from the group consisting of dextrose, a combination of dextrose monohydrate and maltodextrin, fructose, a combination of fructose and maltodextrin, sucrose, a combination of sucrose and maltodextrin, maltose, a combination of maltose and maltodextrin, mannitol, xylose, and a combination of xylose and maltodextrin; and 10–1% by weight of a water soluble binder selected from the group consisting of maltodextrin, corn syrup solids, dextrose, sucrose, poly(vinylpyrrolidone), and cooked starch paste. In such an agglomerate, the carbohydratebased material can, for example, be selected from the group consisting of dextrose monohydrate, a combination of dextrose monohydrate and maltodextrin, fructose, dextrose, mannitol, a combination of fructose and maltodextrin, sucrose, a combination of sucrose and maltodextrin, maltose, a combination of maltose and maltodextrin, xylose, and a combination of xylose and maltodextrin. The water soluble binder is preferably maltodextrin.

The invention further relates to a method of making a chewable nutritional supplement. This method comprises mixing a prenatally relevant amount of at least one vitamin or mineral with an alkyl polysiloxane to yield a mixture and incorporating the mixture into a chewable dosage form, such as a tablet. According to this method, one or more other vitamins and minerals can be mixed with the alkyl polysiloxane. In a preferred method, the alkyl polysiloxane is mixed with folic acid, vitamin $D_3$, vitamin A, vitamin $B_1$, vitamin $B_2$, vitamin $B_6$, vitamin $B_{12}$, vitamin E, vitamin C, an iron compound, and at least one of niacinamide and niacin. One or more active ingredients (e.g. one of an iron compound, vitamin $B_1$, vitamin $B_2$, vitamin $B_6$, vitamin $B_{12}$, niacin, and niacinamide) can be coated in order to enhance their stability, mask their taste or odor, or both.

The compositions and method described herein can be used to improve prior art chewable prenatal supplements and methods of preparing them. By way of example, prior art compositions can be modified to include an alkyl polysiloxane therein, e.g. by incorporating the alkyl polysiloxane into the composition during its manufacture (e.g. in a granulated form).

The invention further relates to a method of alleviating a nutritional disorder in a human. This method comprises administering to the human a chewable prenatal supplement which comprises a prenatally relevant amount of at least one vitamin or mineral associated with the nutritional disorder and an alkyl polysiloxane. Of course, addition of an alkyl polysiloxane to a prior art nutritional composition can be used to improve methods of alleviating human nutritional disorders which involve administering the prior art composition to a human.

Other features, advantages and embodiments of the invention will be apparent to those of ordinary skill in the art from the following description, examples, and appended claims.

DETAILED DESCRIPTION OF THE INVENTION

The present invention relates to a highly palatable, orally administrable nutritional supplement that can contain a prenatally relevant amount of one or more vitamins, a prenatally relevant amount of one or more minerals, or both.

The invention includes chewable vitamin- and mineral-containing nutritional supplements designed for prenatal care. Such supplements are useful, for example, for administration to pregnant and lactating women, to women who anticipate becoming pregnant, and to humans in general for maintenance of a generally good state of health and nutrition. Supplements according to this invention can maximize the overall health of a pregnant women and her unborn fetus and improve the chances that an infant will exhibit a greater birth weight than a comparable infant born of a mother not having received the present supplement. The supplements described herein can also improve and maintain the health of mothers, and can also serve to reduce the incidence, severity, or both, of birth defects.

A significant aspect of the chewable supplement of the invention is that it contains an alkyl polysiloxane, such as simethicone. Although administration of simethicone to humans is known, such administration in the prior art has included simethicone either as a pharmaceutical excipient in topical pharmaceutical preparations or as an active agent to alleviate gastrointestinal gas-related disorders, such as flatulence and bloating. The inventors believe that simethicone has not previously been used as an excipient in orally administrable preparations (e.g. in chewable prenatal multi-vitamin/mineral tablets, as described herein) because the texture-enhancing effects of simethicone were not previously recognized. The prior art appears to be devoid of simethicone-containing prenatal vitamin preparations or any suggestion to make them.

The chewable prenatal supplement of the invention contains an alkyl polysiloxane (such as simethicone USP or a granulated form thereof) and is provided in a chewable dosage form which can include selected nutritional components. These components can be included in dosage levels which have been found to optimize the health of pregnant women, their fetuses, and other humans. The dosage form can include a variety of vitamins, pharmaceutically acceptable excipients, minerals, flavorants, sweeteners, and combinations of these. The tablet is easily masticated and at least a majority of its components dissolve rapidly in the mouth upon chewing for a brief period of time. The chewable prenatal supplement of the invention has an improved mouth feel and enhanced texture, compared to other orally administrable prenatal multi-vitamin formulations.

In one aspect, the nutritional supplement of the invention is a chewable prenatal multi-vitamin tablet comprising:

(a) a plurality of vitamins, including at least a prenatally relevant amount of folic acid;

(b) one or more flavorants;

(c) a texture-enhancing and/or mouth feel-improving amount of an alkyl polysiloxane, preferably in a granular solid form; and (d) one or more pharmaceutically acceptable excipients.

This composition can further comprise one or more carbohydrate tablet bases, such as mannitol, sucrose, sorbitol, dextrose, compressible cellulose, compressible honey, compressible molasses, compressible sugar, or one of the carbohydrate-based agglomerates described herein. The supplement can further comprise one or more nutritious minerals. Preferred vitamins, minerals, flavorants, agglomerates, alkyl polysiloxanes and pharmaceutically acceptable excipients which can be included in the composition are detailed below.

One embodiment of a pressed, chewable prenatal multi-vitamin solid dosage form weighs about 1000 to 2000 milligrams and consists of:

(a) from about 0.1 milligram to about 2.0 milligrams, preferably about 1.0 milligram, of folic acid, or a pharmaceutically acceptable salt form thereof;

(b) from about 100 I.U. to about 800 I.U., preferably about 400 I.U., of vitamin $D_3$;

(c) from about 100 I.U. to about 2000 I.U., preferably about 1000 I.U., of beta carotene;

(d) from about 0.2 milligram to about 8 milligrams, preferably about 2 milligrams, of vitamin $B_1$;

(e) from about 0.5 milligram to about 10 milligrams, preferably about 3 milligrams, of vitamin $B_2$;

(f) from about 2 milligrams to about 20 milligrams, preferably about 10 milligrams, of vitamin $B_6$;

(g) from about 2 micrograms to about 20 micrograms, preferably about 12 micrograms, of vitamin $B_{12}$;

(h) from about 1 I.U. to about 20 I.U., preferably about 11 I.U., of vitamin E acetate;

(i) from about 20 milligrams to about 200 milligrams, preferably about 100 to 200 milligrams, and more preferably about 120 milligrams, of vitamin C in the form of ascorbic acid and/or a pharmaceutically acceptable salt thereof;

(j) from about 5 milligrams to about 40 milligrams, preferably about 10 to 30 milligrams, and more preferably about 20 milligrams, of niacinamide or an equivalent molar amount of niacin;

(k) from about 1 milligram to about 90 milligrams, preferably about 30 to 60 milligrams, and more preferably about 45 milligrams, of elemental iron, in the form of a pharmaceutically acceptable iron compound;

(l) from about 500 milligrams to about 1500 milligrams, preferably about 1115 milligrams, of an agglomerate comprising at least about 25% by weight of a carbohydrate-based material and about 1–10% by weight of a water soluble binder;

(m) from about 0.1 milligram to about 20 milligrams, preferably about 6 milligrams, of one or more flavorants; and (n) from about 1 milligram to about 100 milligrams, preferably about 40 milligrams or, in another embodiment, preferably about 8 to 15 milligrams (e.g. 12 milligrams) of simethicone.

Other preferred embodiments of the invention include those wherein: (1) vitamins and minerals are mixed with the one or more excipients prior to pressing into a tablet; (2) the elemental iron is an iron (II) salt, an iron (III) salt, carbonyl iron, or a combination thereof; (3) the solid dosage form is a tablet having an interior that is softer than its exterior such that the tablet dissolves rapidly in the mouth when the tablet is chewed; (4) calcium is excluded from the solid dosage form or, if present, calcium is provided in a less than therapeutic amount, e.g., less than about 10% of the RDA for calcium; (5) the solid dosage form further comprises one or more additional pharmaceutically acceptable excipients; (6) the flavorant is a berry flavored compound; (7) the alkyl polysiloxane is simethicone (preferably simethicone USP in a solid granular form, such as simethicone GS); (8) one or more of the iron compound, vitamins $B_1$, $B_2$, $B_6$, $B_{12}$, and niacinamide are coated; (9) vitamin C is present as a mixture of ascorbic acid and sodium ascorbate; (10) the iron compound is an iron (II) salt and more preferably ferrous fumarate or ferrous sulfate; (11) the agglomerate comprises at least about 25% by weight of a carbohydrate-based material and about 1–10% by weight of a water soluble binder; (12) the chewable dosage form is lactose free; and (13) the agglomerate is compressible and comprises dextrose.

The vitamins and/or minerals included in the chewable tablet may be coated, non-coated or included within a carbohydrate-based agglomerate. One or more of an iron compound, vitamins $B_1$, $B_2$, and $B_6$, $B_{12}$, and niacinamide are preferably coated prior to being included in the chewable tablet.

As used herein, a "prenatally relevant amount" of a vitamin or mineral is an amount, in an intended daily dose of a nutritional supplement which is at least 10% (preferably at least 25%, 50%, 75%, or more preferably 100%) of the U.S. recommended daily allowance (as set forth by the F.D.A. Center for Food Safety and Applied Nutrition) of that vitamin or mineral for a pregnant or nursing woman. By way of example, R.D.A. values for pregnant women are 1 milligram per day for folic acid and 30 milligrams per day for iron.

Other preferred embodiments include those wherein the agglomerate is compressible and porous and comprises 1–99% by weight of carbohydrate-based material, or carbohydrate particles, selected from the group consisting of dextrose, dextrose monohydrate, maltodextrin, fructose, sucrose, lactose, maltose, mannitol, and xylose, and 1–10% by weight of a water soluble binder selected from the group consisting of maltodextrin, corn syrup solids, dextrose, sucrose, poly(vinylpyrrolidone) and cooked starch paste. The most preferred carbohydrate-based agglomerates include those prepared according to the processes disclosed in U.S. Pat. No. 4,684,534, the entire disclosure of which is hereby incorporated by reference. The chewable tablet preferably has an interior that is softer than its exterior such that the tablet dissolves rapidly in the mouth when the tablet is chewed. Minerals or vitamins included in the chewable tablet can be provided individually, in combinations of two or more, and/or along with the agglomerate as described herein.

When the carbohydrate-based agglomerate material is used as a base for an orallyadministrable formulation, it can be used without adding the alkyl polysiloxane thereto, although it is preferred that the formulation contains the alkyl polysiloxane. Many prior art mineral-containing nutritional supplements are characterized by unpleasant taste (e.g. as with iron-containing supplements) and objectionable textures and mouth feel characteristics (e.g. hard or chalky tablets). One embodiment of the nutritional supplements included within the scope of the invention comprises a carbohydrate-based agglomerate as described herein and a mineral, but does not necessarily comprise an alkyl polysiloxane. Supplements of this type can be used to deliver minerals in greater amounts and with fewer and less objectionable taste/texture/mouth feel characteristics than was possible using prior art compositions. By way of example, prior art iron-containing nutritional supplements generally contain less than 20 milligrams of iron, and often 18 milligrams or less. Many of those prior art compositions have an unpleasant taste attributable, at least in part, to the presence of iron in the supplement. Using the carbohydrate-based agglomerates described herein, it is possible to make palatable orally administrable nutritional supplements that contain iron (or one or more other minerals) in amounts comparable to or greater than prior art compositions, but which have significantly improved taste, texture, and mouth feel than prior art compositions. Addition of an alkyl polysiloxane to the agglomerate/mineral mixture further improves these characteristics. By way of example, the nutritional supplements described herein remain palatable when 15, 20, 25, 30, 40, or 60 milligrams of iron are contained in a unit does (e.g. a unit dose having an overall weight of 2 grams or less, such as a chewable tablet having a weight of 1500 milligrams or less). The iron compound in the supplement can, of course, be coated to further reduce the extent to which it can be detected (e.g. by taste or odor) by a patient self-administering the supplement.

Still other preferred embodiments of the invention include those wherein the one or more excipients are selected from the group consisting of tablet binders, acidifying agents, alkalinizing agents, adsorbents, preservatives, antioxidants, buffering agents, colorants, dispersants, thickeners, solubilizing agents, encapsulating agents, stiffening agents, tablet anti-adherents, tablet excipients, tablet direct compression excipients, tablet disintegrants, tablet glidants, and tablet lubricants.

In a preferred form, the ingredients are mixed and compressed to form a liquescent chewable tablet. The chewable prenatal supplement can comprise additional nutritional ingredients as described below which are provided in corresponding pharmaceutically acceptable forms.

The chewable prenatal multivitamin solid dosage form of the invention comprises commercially available ingredients. The agglomerate, vitamins, minerals, alkyl polysiloxane (e.g. simethicone USP), pharmaceutically acceptable excipients, flavorants, and other ingredients can be obtained from companies such as Aldrich Chemical Co., FMC Corp, Bayer, BASF, Alexi Fres, Witco, Mallinckrodt, Rhodia, ISP, and others.

When a carbohydrate-based agglomerate is included in the supplement, the agglomerate is preferably prepared according to the process described in U.S. Pat. No. 4,684,534 to Valentine. The agglomerate is formed from carbohydrate-based material, preferably particles, and a water-soluble binder with or without an active ingredient. The agglomerate can be provided with or without an active ingredient within it. The agglomerate without the active ingredient generally has a bulk density of from about 40 percent to about 55 percent of the bulk density of the carbohydrate-based particles before they are processed into the agglomerate. The bulk density of the agglomerate itself is relatively low and in the range of from about 0.2 grams per square centimeter to about 0.6 grams per square centimeter (12.5 pounds per cubic foot to 37.5 pounds per cubic foot). A substantial part of the agglomerate is thought to consist of voids, i.e., pores or ducts, which provide an extremely large surface area capable of entraining and dispersing substantial quantities of active ingredients, ordinarily about 10 percent to about 50 percent by weight of the finished agglomerate (which includes the entrained active ingredient). The agglomerate is particularly useful as a direct compression excipient from which multivitamin solid dosage forms according to the invention can be made, particularly chewable tablets which liquefy in saliva following mastication.

A process for making the carbohydrate-based agglomerate generally comprises the steps of forming a fluidized bed of carbohydrate particles, intermittently spraying a solution of the water soluble binder in a droplet size of from about 20 micrometers to about 100 micrometers into the fluidized bed so as to cause intimate mixing of solution and carbohydrate particles and adhesion together of carbohydrate particles to form agglomerated particles, drying the particles in the fluidized bed between intermittent sprayings, and continuing spraying and drying until the desired amount of solution has been sprayed into the bed. Thereafter, the agglomerated particles are dried to a desired moisture content or the equilibrium moisture content. The amount of liquid binder solution sprayed corresponds to a binder content in the agglomerate of from about 1 percent to about 10 percent by weight of the agglomerate (excluding active ingredient). The carbohydrate-based agglomerate and an active ingredient can be mixed, preferably in a low shear blender, in the following proportion by weight of the finished agglomerate (including active ingredient):agglomerate, about 50 percent to about 90 percent; active ingredient, from about 10 percent to about 50 percent. A lubricant can be mixed together with the agglomerate and the active ingredient in the proportion of from about 0.4 percent to about 1 percent by weight of the finished agglomerate (including active ingredient). Flavors can also be mixed with the agglomerate and active ingredient.

A process for making a chewable prenatal multivitamin tablet from the finished carbohydrate-based agglomerates described above including from about 0.4 percent to about 1.0 percent of a lubricant, comprises blending the agglomerate with active ingredients and a lubricant to form a substantially homogeneous mixture, which is placed in a conventional tablet-forming apparatus and compressed to a hardness sufficient to hold the tablet together and substantially destroy the open pore structure of the agglomerate at the surface of the tablet while substantially maintaining the open pore, i.e., large surface area, structure of the agglomerate in the interior of the tablet. Thus, the agglomerate is compressed so that the interior of the tablet retains the essential porous structure and other physical characteristics of the agglomerate which enable it to liquefy quickly when chewed, while the physical characteristics of the agglomerate are changed primarily at the surface of the tablet.

Preferred agglomerates include those comprising the following materials: dextrose monohydrate; dextrose monohydrate and maltodextrin; fructose; dextrose; mannitol; fructose and maltodextrin; sucrose; sucrose and maltodextrin; maltose; maltose and maltodextrin; xylose; xylose and maltodextrin. Aqueous solutions of the following materials are preferably used as the liquid binder solution: maltodextrin, corn syrup solids; dextrose; sucrose; poly(vinylpyrrolidone); cooked starch paste; and combinations of the foregoing. The maltodextrin binder material preferably has a DE (dextrose equivalence) of less than about 20% and even more preferably in the range of from about 5% to about 12%.

The term "active ingredient" as used herein encompasses any material such as a vitamin, mineral, iron compound, flavorant, sweetener, flavorant or nutritious material and combinations thereof. Active ingredients also include but are not limited to food acids; insoluble metal and mineral hydroxides, carbonates, oxides, polycarbophils and salts thereof; adsorbates of active drugs on a magnesium trisilicate base or on a magnesium aluminum silicate base.

The vitamins used in the solid dosage form of the invention can be used in essentially any commercially available form. They need not be provided with an agglomerate. The vitamins, and/or minerals can also be included within the agglomerate, either separately or in combination, prior to tablet preparation, to form an agglomerate comprising at least about 25% by weight of a carbohydrate-based material, about 1–10% by weight of a water soluble binder, and the remaining weight of the vitamin and/or mineral. Preferably at least one of folate and iron is incorporated at a prenatally relevant level in a unit dose (i.e. a daily dose) of the supplement, such as 0.1–2 milligrams (preferably at least about 0.5 milligram, or more preferably at least about 1.0 milligram) folic acid or 1.5–100 milligrams (preferably at least about 15 milligrams, and more preferably at least about 30, 45, or 60 milligrams) iron.

The vitamins and/or minerals can also be coated or granulated. Sprayable coatings such as DESCOTE™ or ROCOAT™ can be used to coat these active ingredients, or they can be coated, for example, with mono- and di-glycerides of edible fatty acids or stearic acid, with stearic acid, with cellulose polymers (e.g. carboxymethylcellulose, methylcellulose, hydroxypropylcellulose, hydroxypropylmethylcellulose, ethylcellulose, etc.), with corn protein, with cellulose acetate phthalate, or with similar coating agents. Active ingredients and excipients can be individually granulated, using either a wet or dry granulation process, or two or more of these can be mixed prior to granulation. As is known in the art, granulation of ingredients can improve their handling and processing properties (e.g. tendency to flow, ease of mixing with powders, agglomerates, or other granulated products, etc.).

A chewable prenatal multivitamin tablet according to the invention can be made as described herein, for example in Examples 2–3. Generally, some combination of one or more vitamins, one or more minerals, agglomerate, flavorant, alkyl polysiloxane (preferably in a granular solid form, such as simethicone GS{30% simethicone USP in granular form}), and excipients are mixed and compressed to form tablets. When the tablet is pressed, it has an interior that is measurably softer than its exterior. This type of construction in combination with the vitamin agglomeration facilitates rapid dissolution of the tablet in the mouth shortly after it has been chewed. Further, this type of construction reduces the tablet's extent of atmospheric water absorption, i.e. it has reduced hygroscopicity.

The particular combination of vitamins and other nutritional ingredients in the claimed chewable prenatal multi-vitamin tablet advantageously provides a product having high nutritional value, high bioavailability, high palatability, and reduced side effects. Further, the preferred absence of calcium from the tablet ensures minimal interference of iron absorption by minerals present in the tablet. Side effects (e.g. gagging, poor taste, unpleasant mouth feel, etc.) which are typically associated with administration of related prior art prenatal multi-vitamin products are reduced in people receiving an orally administered supplement described herein, particularly including the chewable forms described below.

The vitamins and other nutritional ingredients can be provided in the amounts and ranges detailed herein, although these amounts and ranges can, of course, be modified as desired. The amounts of non-nutritive components of the compositions can be varied in order to control the final weight of the tablet. For example, the amounts detailed in Example 2 are used to form chewable prenatal supplement tablets weighing 1600 milligrams. Of course, instead of making a supplement consisting of a single 1600 milligram tablet, supplements wherein a recommended daily dose consists of two or more tablets can also be made (e.g. a dosage form for which daily administration of two 800 milligram tablets is contemplated).

For example, when a composition described herein is used as a prenatal daily multi-vitamin/mineral supplement, the composition preferably comprises amounts of vitamins and minerals in the following ranges:

(a) about 1–1000 milligrams of iron (preferably at least about 15, 30, 45, 60, or 90 milligrams);
(b) about 0.1–2.0 milligrams of folic acid (preferably at least about 1–1.2 milligrams);
(c) about 100–2000 International Units (I.U.) of vitamin A (preferably at least about 1000–1100 I.U.);
(d) about 0.2–8 milligrams of vitamin $B_1$ (preferably at least about 2–2.4 milligrams);
(e) about 0.5–10 milligrams of vitamin $B_2$ (preferably at least about 3–3.5 milligrams);
(f) about 2–50 milligrams of vitamin $B_6$ preferably at least about 10–12 milligrams);
(g) about 2–20 micrograms of vitamin $B_{12}$ (preferably at least about 12–14.4 milligrams);
(h) about 20–200 milligrams of vitamin C (preferably at least about 120–132 milligrams);
(i) about 100–800 I.U. of vitamin $D_3$ (preferably at least about 400–440 I.U.);
(j) about 1–50 I.U. of vitamin E (preferably at least about 11–13 I.U.); and
(k) about 5–40 milligrams of one of niacin and niacinamide (preferably at least about 20–22 milligrams of niacinamide or an equivalent molar amount of niacin).

Due to the advantageous construction and composition of the chewable prenatal supplements described herein, the supplement tablet is significantly smaller that other chewable tablets including similar types and amounts of nutritive ingredients. It is believed that many women would prefer to ingest a smaller tablet, given the option to do so. One of the advantages of compositions described herein (particularly those which do not comprise a calcium salt) is that tablets which comprise an FDA recommended daily dose of iron, vitamins, and non-ferrous minerals other than calcium can be made significantly smaller than prior art chewable prenatal supplement tablets which contain such components. The smaller size that is made possible by this invention is a further advantage that can improve patient compliance with nutritional supplement administration. Because calcium can interfere with iron uptake, absence of calcium from compositions described herein also improves the efficacy of those compositions for providing iron to mammals.

Preferably, the dosage form described herein is provided as a single or subdivided into several unit doses containing appropriate quantities of the vitamins. The unit dosage form can be a packaged preparation, the package containing discrete quantities of preparation, for example, packets containing one or another selected number of tablets, envelopes containing a selected amount of a powder or granular preparation, or the like. The term "unit dosage form" means a selected quantity of vitamins and minerals and one or more excipients contained in a discrete number or amount of a nutritional supplement described herein (e.g. a single table, a selected number of tablets, or a selected amount of a granular preparation). The quantity can be selected to match an amount that is provided by a single therapeutic administration (e.g. an amount about equal to the R.D.A. for one or more of the vitamins and minerals therein). The nutritional supplement can also be provided in multiple dose forms, such as scored tablets, wherein the selected quantity is contained in a fraction, such as a half or quarter of a scored tablet, of the multiple dose form. The specific dose level for any patient will depend upon a variety of factors including the indication being treated, patient health, age, sex, weight, diet, and pharmacological response, and other such factors. The formulation of the present invention can be made in unit doses of less than about 2000 milligrams, particularly less than about 1700 milligrams.

Determination of the proper dosage for a particular situation is within the skill of the art. For convenience, the total daily dosage may be divided and administered in portions during the day if desired or at one time, morning, afternoon, night as well as biphasic, triphasic, etc. Controlled and immediate release formulations are within the scope of the invention.

The components of the solid dosage form are preferably finely divided, i.e. powdered or granulated so as to provide a uniform distribution of ingredients throughout the dosage form. Finely divided components also flow well in tablet presses and other processing machinery, and tend to make tablets having advantageous properties (e.g. chip resistance, homogeneity, etc.). Preferably, not less than about 70% of the finely divided ingredients will pass through a 60 mesh (250 micrometer) screen. In another embodiment, not less than about 80%, even more preferably not less than 90%, of a component will pass through a 50 mesh (300 micrometer) screen. In another embodiment, not less than 80%, more preferably not less than 90%, of a component will pass through a 100 mesh (150 microns) screen.

Materials to be incorporated in the present formulation can be pretreated to form granules. This process is known as granulation. As commonly defined, "granulation" is any process of size enlargement whereby small particles are gathered together into larger, permanent aggregates to yield a free-flowing composition having a suitable consistency. Granulated compositions may have consistency similar to that of dry sand. Granulation may be accomplished by agitation in mixing equipment or by compaction, extrusion, or agglomeration. Any wet or dry granulation method known in the art or hereafter developed can be used to granulate the components described herein; the precise method used is not critical. For example, in a dry granulation method, dry ingredients (e.g. a vitamin and an excipient) are blended to uniformly disperse each in the other(s). A granulation agent can be added, to which the dry ingredients adhere. Adherence of the ingredients to the granulation agent generates larger, uniform particles that have advantageous handling properties. In an example of a wet granulation method, dry ingredients are blended to uniformly disperse each in the other(s). A granulating solution (i.e. a binding agent in solution) is added to the blended dry ingredients, and the binding agent binds the ingredients. The mixture is dried and optionally milled. The resulting product comprises particles that also have advantageous handling properties.

Vitamins that have been coated, granulated, or agglomerated individually or in combination can be further coated, agglomerated, or granulated prior to being compressed into a solid dosage form.

Iron, among other minerals, can be included within the chewable prenatal multivitamin tablet of the invention. Elemental iron refers to the iron component of an iron compound. A pharmaceutically acceptable iron compound will be either "slowly dissolving" or "rapidly dissolving". A pharmaceutically acceptable iron compound can be selected from any of the wellknown iron (II) (ferrous) salts, iron (III) (ferric) salts, and particulate iron compositions such as carbonyl iron. Examples of iron compounds which are contemplated include ferrous fumarate, ferrous sulfate, ferrous folate, iron dextrans, ferric oxyhydroxide dextrans, chitosan derivatives of iron, oligosaccharide derivatives of iron, ferrous acetyl salicylate, ferrous gluconate, ferrous diphosphate, carbonyl iron, ferric orthophosphate, ferrous glycine sulfate, ferrous chloride, ferrous ammonium citrate, ferric ammonium tartrate, ferric phosphate, ferric potassium tartrate, ferric albuminate, ferric cacodylate, ferric hydroxide, soluble ferric pyrophosphate, ferric quinine citrate, ferric valerate, saccharated iron oxide, ferric chloride, ferrous iodide, ferrous nitrate, ferrous glycerophosphate, ferrous formate, amino acid/iron salts, iron salts of protein hydrolysates, ferrous lactate, ferrous tartrate, ferrous succinate, ferrous glutamate, ferrous citrate, ferrous pyrophosphate, ferrous cholinisocitrate, ferrous carbonate, iron-sugar-carboxylate complexes, ferrous sucrate-malate, ferrous sucrate citrate, ferrous fructate-citrate, ferrous sucrate-ascorbate, ferrous fructate-ascorbate, and combination of these.

Examples of rapidly dissolving iron compounds include ferrous sulfate, ferrous fumarate, ferrous gluconate, ferric ammonium citrate, and iron-protein succinylate. Rapidly dissolving iron compounds have a solubility in water at 25° C. greater than about 1 part in 1000 (i.e. 1 part of the iron compound is soluble in fewer than 1000 parts of water). Preferred examples of rapidly dissolving iron compounds include ferrous sulfate and ferrous fumarate, which can be used interchangeably in many formulations described herein.

Examples of slowly dissolving iron compounds include ferric pyrophosphate and carbonyl iron. Slowly dissolving iron compounds have a solubility in water at 25° C. not less than about 1 part in 1000, preferably not less than about 1 part in 5000, and more preferably not less than about 1 part in 10,000 (i.e. 1 part of the iron compound is soluble in no fewer than 10,000 parts of water). Use of carbonyl iron is preferred. As is known in the art, carbonyl iron is a small particle preparation of highly purified metallic iron, "carbonyl" merely describing a process by which this compound can be made. Carbonyl iron is typically made by heating gaseous iron pentacarbonyl, $Fe(CO)_5$, which deposits metallic iron as submicroscopic crystals that form microscopic spheres. It is furthermore recognized that designation of carbonyl iron (i.e. metallic iron) as an iron 'compound' is not in strict conformity with the traditional use of the word compound. Carbonyl iron is nonetheless referred to herein as an iron compound (i.e. a slowly dissolving iron compound).

A "rapidly dissolving" iron compound is an iron compound wherein a known amount of the compound substantially completely dissolves in a sufficient volume of saliva or a gastrointestinal fluid in less than about 3 hours, preferably less than about 1 hour. Generally, many iron salts, especially iron (II) salts are considered rapidly dissolving. It is understood that iron (II) salts having different counter-ions will typically exhibit different dissolution rates.

A "slowly dissolving" iron compound is an iron compound wherein a known amount of the compound substantially completely dissolves in a sufficient volume of saliva or a gastrointestinal fluid in greater than about 3 hours, preferably greater than about 8 hours, more preferably greater than about 12 hours, and even as long as 48 hours (but preferably not greater than 24 hours. Generally, iron (0) (e.g. carbonyl iron) and many iron (III) salts will be "slowly dissolving."

The rate of dissolution of an iron compound or other mineral used in the nutritional supplement described herein depends upon the salt anion (if any) complexed with the mineral, the valence of the mineral, and the solution in which the mineral is dissolved (e.g., water, stomach fluids {acidic}, and fluids from other regions of the gastrointestinal tract, such as intestinal fluids {near neutral pH}).

The minerals, especially iron, included in the chewable prenatal supplement tablet of the invention will preferably have a particle size less than about 200 micrometers, more preferably less than about 50 micrometers. The smaller particle size decreases any gritty organoleptic effect and increases the bioavailability as well as the rate of dissolution of the iron.

The present formulation can also include various forms of extended release particles or coatings along with immediate release particles or coatings to deliver the various vitamins and mineral supplements over various rates of release. For example, certain agents such as thiamine, niacinamide, niacin, pyridoxine, ascorbic acid, folic acid, iron, and riboflavin could be released over an extended period of time from two hours up to 24 hours while other agents such as beta carotene, vitamin A, vitamin $D_3$, vitamin $B_{12}$, biotin, pantothenic acid, copper, zinc, magnesium, potassium, iodine, chromium, molybdenum, and selenium can be administered as immediate release. Formulations having a combination of particles with different release profiles are well known and are prepared according to procedures and techniques known to the artisan of ordinary skill.

More particularly, an iron compound included in chewable prenatal supplement can comprise a pharmaceutically acceptable iron compound coated with a pharmaceutically acceptable film forming material which permits release of the iron in the intestine of a human administered the supplement. Suitable coatings include those described below. The coated iron compound has been found to provide increased iron bioavailability by minimizing interaction between the iron compound and divalent cations, such as calcium and magnesium, in the nutritional supplement. Release of the iron in the intestine also minimizes stomach upset.

As used in this disclosure, the term "vitamin" refers to trace organic substances that are required in the diet, and more particularly to the vitamins described above. For the purposes of the present invention, the term "vitamin(s)" include, without limitation, thiamine, riboflavin, folic acid, niacinamide, niacin, beta carotene, nicotinic acid, pantothenic acid, pyridoxine, biotin, folic acid, cysteine, cystine, cyanocobalamin, vitamin $B_{12}$, vitamin $B_1$, vitamin $B_2$, vitamin $B_3$, vitamin K, vitamin $B_6$, lipoic acid, sodium ascorbate, ascorbic acid, vitamin A, vitamin D, vitamin $D_3$, vitamin C, vitamin E acetate and vitamin E. Also included within the term "vitamin" are the coenzymes which incorporate a vitamin listed above. Coenzymes are specific chemical forms of vitamins. Coenzymes include thiamine pyrophosphates (TPP), flavin mononucleotide (FMM), flavin adenine dinucleotide (FAD), nicotinamide adenine dinucleotide (NAD), nicotinamide adenine dinucleotide phosphate (NADP), coenzyme A (CoA), pyridoxal phosphate, biocytin, tetrahydrofolic acid, coenzyme $B_{12}$, lipoyllysine, 1 1-cis-retinal, and 1,25-dihydroxycholecalciferol. The term "vitamin(s)" also includes choline, carnitine, and alpha, and gamma carotenes.

As used in this disclosure, the term "mineral" refers to inorganic substances, metals, and others known to those of ordinary skill in the art required in the human diet. Thus, the term "mineral" as used herein includes, without limitation, calcium, iron, zinc, selenium, copper, iodine, phosphorus, chromium, molybdenum, manganese, magnesium stearate, magnesium carbonate, magnesium oxide, magnesium hydroxide, and magnesium sulfate. Iron-containing nutritional supplements preferably do not contain calcium, since calcium is known to interfere with or inhibit iron uptake in humans. As used with reference to a vitamin or mineral, the terms "effective amount" and "nutritionally relevant amount" interchangeably mean an amount at least about 10% of the United States Recommended Daily Allowance ("RDA") of that particular ingredient for a human. For example, if an intended ingredient is vitamin C, then an effective amount of vitamin C would include an amount of vitamin C sufficient to provide 10% or more of the RDA. Typically, where the tablet includes a mineral or vitamin, it will incorporate higher amounts, preferably about 100% or more of the applicable RDA.

The vitamins and minerals contained within the chewable supplement are formulated as their pharmaceutically acceptable salts when necessary. As used herein, "pharmaceutically acceptable salts" refer to derivatives of the disclosed compounds wherein the therapeutic compound is modified by making acid or base salts thereof. Examples of pharmaceutically acceptable salts include, but are not limited to, mineral or organic acid salts of basic residues such as amines; alkali or organic salts of acidic residues such as carboxylic acids; and others known to those of ordinary skill in the art. The pharmaceutically acceptable salts include the conventional non-toxic salts or the quaternary ammonium salts of the parent compound formed, for example, from non-toxic inorganic or organic acids. For example, such conventional nontoxic salts include those derived from inorganic acids such as hydrochloric, hydrobromic, sulfuric, sulfonic, sulfamic, phosphoric, nitric and others known to those of ordinary skill in the art; and the salts prepared from organic acids such as amino acids, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and others known to those of ordinary skill in the art. The pharmaceutically acceptable salts of these compounds are available from well known commercial sources.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The dosage form of the invention can contain any of a variety of hydrophobic or hydrophilic binders. Examples of suitable hydrophobic binders include cellulose acetate butyrate, cellulose acetate propionate, cellulose propionate of high molecular weight (200,000), cellulose propionate of medium molecular weight (75,000), cellulose propionate of low molecular weight (25,000), cellulose acetate, cellulose nitrate, ethylcellulose, polyvinyl acetate, and others known to those of ordinary skill in the art. Examples of suitable hydrophilic binders include poly(vinylpyrrolidone), vinyl alcohol polymer, polyethylene oxide, water soluble or water swellable cellulose and starch derivatives and others known to those of ordinary skill in the art.

Examples of other binders which can be added to the formulation include, for example, acacia, tragacanth, gelatin, starch, cellulose materials such as methyl cellulose and sodium carboxymethyl cellulose, alginic acids and salts thereof, polyethylene glycol, guar gum, polysaccharide, sugars, invert sugars, poloxomers (PLURONIC™ F68, PLURONIC™ F127), collagen, albumin, gelatin, cellulosics in non-aqueous solvents, pre-gelatinized starch, starch paste and combinations of the above. Other binders include, for example, polypropylene glycol, polyoxyethylene-polypropylene copolymer, polyethylene ester, polyethylene glycol, polyethylene sorbitan ester, polyethylene oxide or combinations thereof and others known to those of ordinary skill in the art.

One or more excipients are preferably included in chewable tablets of the invention. Examples of excipients include, without limitation, acidifying agents, alkalinizing agents, adsorbents, antifungal preservatives, antioxidants, buffering agents, colorants, disintegrants, encapsulating agents, flavorants, hygroscopic agents, plasticizers, stiffening agents, sweetening agents, tablet anti-adherents, tablet binders, tablet direct compression excipients, tablet disintegrants, tablet glidants, and tablet lubricants.

As used herein, the term "acidifying agent" means a compound used to provide acidic medium for product taste or stability. Such compounds include, by way of example and without limitation, solid organic acids such as citric acid and ascorbic acid.

As used herein, the term "alkalinizing agent" means a compound used to provide alkaline medium for product stability. Such compounds include, by way of example and without limitation, tricalcium phosphate and magnesium trisilicate.

As used herein, the term "adsorbent" means an agent capable of holding other molecules onto its surface by physical or chemical (chemisorption) means. Such compounds include, by way of example and without limitation, powdered and activated charcoal and others known to those of ordinary skill in the art.

Disintegrants include materials which aid in the disintegration and/or dissolution of the chewable tablet and its ingredients. Disintegrants include starches such as corn starch, potato starch, pre-gelatinized and modified starches thereof, cellulosic agents such as Ac-di-sol, montmorrilonite clays, cross-linked PVP, sweeteners, bentonite, VEEGUM™, microcrystalline cellulose, alginates, sodium starch glycolate, gums such as agar, guar, locust bean, karaya, pectin and tragacanth.

As used herein, the term "antioxidant" means an agent which inhibits oxidation and thus is used to prevent deterioration of preparations by the oxidative process. Such compounds include, by way of example and without limitation, ascorbic acid, ascorbyl palmitate, butylated hydroxyanisole, butylated hydroxytoluene, hypophophorous acid, monothioglycerol, propyl gallate, sodium ascorbate, sodium bisulfite, sodium formaldehyde sulfoxylate and sodium metabisulfite and others known to those of ordinary skill in the art.

As used herein, the term "buffering agent" means a compound used to resist change in pH upon dilution or addition of acid or alkali. Such compounds include, by way of example and without limitation, ascorbic acid/sodium ascorbate.

As used herein, the term "colorant" means a compound used to impart color to solid (e.g., tablets and capsules) pharmaceutical preparations. Such compounds include, by way of example and without limitation, FD&C Red No. 3, FD&C Red No. 20, FD&C Yellow No. 6, FD&C Blue No. 2, D&C Green No. 5, FD&C Orange No. 5, D&C Red No. 8, caramel, and ferric oxide, red and others known to those of ordinary skill in the art. Coloring agents can also include pigments, dyes, tints, titanium dioxide, natural coloring agents such as grape skin extract, beet red powder, beta carotene, annato, carmine, turmeric, paprika, CHROMA-KOTE™ and others known to those of ordinary skill in the art. It is recognized that no colorant is required, and it is preferred that no colorant be included in the chewable nutritional supplement described herein.

As used herein, the term "flavorant" means a natural or artificial compound, or some combination of these, used to impart a pleasant flavor and often odor to a pharmaceutical preparation. Flavors incorporated in the composition may be chosen from natural and synthetic flavor oils and flavoring aromatics and/or natural oils, extracts from plants, leaves, flowers, fruits, and combinations thereof. Such compounds include, by way of example and without limitation, anise oil, cinnamon oil, vanilla, vanillin, cocoa, chocolate, menthol, grape, peppermint oil, oil of wintergreen, clove oil, bay oil, anise oil, eucalyptus, thyme oil, cedar leave oil, oil of nutmeg, oil of sage, oil of bitter almonds, cassia oil; citrus oils such as lemon, orange, lime and grapefruit oils; and fruit essences, including apple, pear, peach, berry, wildberry, date, blueberry, kiwi, strawberry, raspberry, cherry, plum, pineapple, and apricot. All of these flavorants are commercially available. Preferred flavorants include natural berry extracts. The amount of flavoring may depend on a number of factors, including the organoleptic effect desired.

As used herein, the term "sweetening agent" means a compound used to impart sweetness to a preparation. Such compounds include, by way of example and without limitation, aspartame, dextrose, saccharin sodium, maltodextrin, sucrose high fructose corn syrup, fructose oligosaccharides, and others known to those of ordinary skill in the art. The carbohydrate material in the agglomerate can also be a sweetening agent.

As used herein, the term "tablet anti-adherents" means agents which prevent the sticking of table formulation ingredients to punches and dies in a tabletting machine during production. Such compounds include, by way of example and without limitation, magnesium stearate, calcium stearate, stearic acid, talc, and others known to those of ordinary skill in the art.

As used herein, the term "tablet binders" means substances used to cause adhesion of powder particles in table granulations. Such compounds include, by way of example and without limitation, acacia, alginic acid, carboxymethylcellulose sodium, compressible sugar (e.g., NuTab), ethylcellulose, gelatin, liquid glucose, methylcellulose, maltodextrin, povidone, pre-gelatinized starch, those described above and others known to those of ordinary skill in the art.

As used herein, the term "tablet excipient" means inert substances used as fillers to create the desired bulk, flow properties, and compression characteristics in the preparation of tablets and capsules. Such compounds include, by way of example and without limitation, dibasic calcium phosphate, kaolin clay, fructose, sucrose, dextrose, lactose, mannitol, microcrystalline cellulose, powdered cellulose, precipitated calcium carbonate, sorbitol, calcium sulfate, starch, and others known to those of ordinary skill in the art.

As used herein, the term "tablet direct compression excipient" means a compound used in direct compression tablet formulations. Such compounds include, by way of example and without limitation, dibasic calcium phosphate (e.g., DITAB™), spray dried, or anhydrous lactose, microcrystalline cellulose, (AVICEL™), dextran (EMDEX™), sucrose (NUTAB™) and others know to those of ordinary skill in the art.

As used herein, the term "tablet glidant" means agents used in tablet and capsule formulations to reduce friction during tablet compression. Such compounds include, by way of example and without limitation, colloidal or fumed silica, magnesium stearate, cornstarch, and talc and others known to those of ordinary skill in the art.

As used herein, the term "tablet lubricant" means substances used in tablet formulations to reduce friction during tablet compression. Such compounds include, by way of example and without limitation, calcium stearate, magnesium stearate, mineral oil, stearic acid, hydrogenated vegetable oil, benzoic acid, poly(ethylene glycol), NaCl, PRUV™, zinc stearate and others known to those of ordinary skill in the art.

Alkyl polysiloxanes are commercially available polymers that are sold in a variety of molecular weight ranges and with a variety of different substitution patterns. Alkyl polysiloxanes generally comprise a silicon and oxygen-containing polymeric backbone with one or more alkyl groups pending from the silicon atoms of the back bone. Depending upon their grade, they can further comprise silica gel. Alkyl polysiloxanes are generally viscous oils. Exemplary alkyl polysiloxanes that can be used in the chewable tablet of the present invention include monoalkyl or dialkyl polysiloxanes, wherein the alkyl group is independently selected at each occurrence from a $C_1$–$C_6$-alkyl group optionally substituted with a phenyl group. A preferred alkyl polysiloxane is dimethyl polysiloxane, which is generally referred to as simethicone. The preferred alkyl polysiloxane for use in the compositions and methods described herein is a granular simethicone preparation designated simethicone GS. Simethicone GS is a preparation which contains 30% simethicone USP. Simethicone USP contains not less than 90.5% by weight $(CH_3)_3$—$Si\{OSi(CH_3)_2\}CH_3$ in admixture with 4.0–7.0% by weight $SiO_2$.

The alkyl polysiloxane is present in an amount sufficient to enhance the texture, the mouth feel, or both of the chewable supplement described herein. By "enhance the texture" is meant that the alkyl polysiloxane improves one or more of the stiffness, the brittleness, and the chewiness of a chewable supplement, relative to the same preparation lacking the polysiloxane. By "enhance the mouth feel" is meant that the alkyl polysiloxane reduces the gritty texture of the supplement once it has liquefied in the mouth or otherwise renders the supplement more pleasant or agreeable or less objectionable, relative to the same preparation lacking the polysiloxane.

The alkyl polysiloxane will generally be included in the supplement by mixing it with the other ingredients of the supplement prior to compression to form a tablet or other chewable form. The alkyl polysiloxane can be added to the other ingredients as an oil, included in a diluted solution which is sprayed onto the other ingredients or converted to solid form by immobilization or adsorption of the alkyl polysiloxane onto another solid, such as a pharmaceutically acceptable excipient or an agglomerate. Preferably, the alkyl polysiloxane is used as a granular preparation such as simethicone GS. For example, simethicone can be adsorbed onto a pharmaceutically acceptable excipient to form an adsorbed simethicone which is then mixed with the other ingredients of the chewable solid dosage form. Alternatively, simethicone is adsorbed onto or entrained within a carbohydrate-based material such as that used in the above-described agglomerate, or is included within the agglomerate prior to mixing with the other ingredients of the chewable solid dosage form. The simethicone can also be coated onto or mixed with any one or more of the other active ingredients of the chewable supplement prior to mixing.

The foregoing will be better understood with reference to the following examples which detail certain procedures for the preparation of formulations according to the present invention. All references made to these examples are for the purposes of illustration. They are not to be considered limiting as to the scope and nature of the present invention.

EXAMPLE 1

Preparation of an Agglomerate

The carbohydrate-based agglomerate used in chewable tablets described herein was made according to the procedure described in U.S. Pat. No. 4,684,534 to Valentine which is hereby incorporated by reference in its entirety.

EXAMPLE 2

Preparation of a Chewable Prenatal Multi-vitamin Tablet

The following ingredients were obtained in the quantities indicated to make one hundred 1,600 milligram chewable prenatal supplement tablets.

(a) 100 milligrams of folic acid (USP)
(b) 40,000 I.U. of vitamin $D_3$ (100,000 I.U. per gram);
(c) 100,000 I.U. of beta carotene (333,333 I.U. per gram; 10% cold water soluble or 10% dilution);
(d) 200 milligrams of vitamin $B_1$ (33% by weight coated with DESCOTE™);
(e) 300 milligrams of vitamin $B_2$ (33% by weight coated with DESCOTE™);
(f) 1,000 milligrams of vitamin $B_6$ (33% by weight coated with DESCOTE™);
(g) 1,200 micrograms of vitamin $B_{12}$ (1% triturate in modified starch);
(h) 1,100 I.U. of vitamin E acetate (50%);
(i) 12,000 milligrams of vitamin C (7,340 milligrams of sodium ascorbate (United States Pharmacopeia/Food Chemicals Codex; USP/FCC) and 4,660 milligrams of ascorbic acid (USP/FCC)
(j) 2,000 milligrams of niacinamide (33.3% by weight coated with DESCOTE™);
(k) 2,900 milligrams of ferrous fumarate (32.87% Fe, USP);
(l) 111,552 milligrams of dextrose agglomerate;
(m) 4,000 milligrams of simethicone GS;
(n) 1,500 milligrams of magnesium stearate;
(o) 1,600 milligrams of tricalcium phosphate; and
(p) 600 milligrams of artificial berry flavor.

The ingredients (a) through (k) were mixed to form an active ingredient mixture premix. The ingredients (1), (m) and (p) were mixed to form an excipient mixture, and the active ingredient mixture was added thereto to form a blend. The ingredients (o) and (n) were added to the blend with mixing to form a multivitamin composition, which was compressed to form one hundred individual 1,600 milligrams chewable tablets suitable for use as prenatal nutritional supplements.

EXAMPLE 3

Preparation of a Chewable Prenatal Multi-vitamin Tablet

The following ingredients are obtained in the quantities indicated for preparation of 165,000 individual 1,600 milligram chewable prenatal supplement tablets.

(a) 206 grams of folic acid (USP)
(b) 725 grams of vitamin $D_3$ (100,000 I.U. per gram);
(c) 1.089 kilograms of beta carotene (333,333 I.U. per g; 10% cold water soluble);
(d) 1.188 kilograms of vitamin $B_1$ (33% by weight, coated with DESCOTE™);
(e) 1.737 kilograms of vitamin $B_2$ (33% by weight coated with DESCOTE™);
(f) 5.940 kilograms of vitamin $B_6$ (33% by weight coated with DESCOTE™);
(g) 2.376 kilograms of a 0.1% triturate of vitamin $B_{12}$;
(h) 4.356 kilograms of vitamin E acetate (50% by weight);
(i) 8.458 kilograms of ascorbic acid and 14.982 kilograms of sodium ascorbate (vitamin C);
(j) 10.890 kilograms of niacinamide (33.3% by weight coated with DESCOTE™; or an equivalent molar amount of niacin);
(k) 15.286 kilograms of ferrous fumarate (32.87% Fe);
(l) 184.061 kilograms of compression dextrose (obtained from Advanced Technology Pharmaceutical Company);

(m) 6.600 kilograms of simethicone GS (obtained from Advanced Technology Pharmaceutical Company);
(n) 2.475 kilograms of magnesium stearate;
(o) 2.640 kilograms of tricalcium phosphate; and
(p) 990 grams of wildberry flavor.

The ingredients (a) through (k) are mixed to form an active ingredient mixture premix. The ingredients (l), (m) and (p) are mixed to form an excipient mixture, and the active ingredient mixture is added thereto to form a blend. The ingredients (o) and (n) are added to the blend with mixing to form a multivitamin composition, which is compressed to form one 165,000 individual 1,600 milligrams chewable tablets suitable for use as prenatal nutritional supplements.

The above is a detailed description of particular embodiments of the invention. Those of ordinary skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. A chewable prenatal nutritional supplement which comprises a prenatally relevant amount of folic acid, a prenatally relevant amount of iron, and an alkyl polysiloxane, wherein the supplement is substantially free of calcium.

2. The chewable prenatal nutritional supplement of claim 1, wherein the supplement is a chewable tablet.

3. The chewable prenatal nutritional supplement of claim 1, in a unit dosage form.

4. The chewable prenatal nutritional supplement of claim 1, wherein the alkyl polysiloxane is present in an amount of about 0.05 weight percent to less than one weight percent of the supplement.

5. The chewable prenatal nutritional supplement of claim 1, wherein the alkyl polysiloxane is dimethyl polysiloxane.

6. The chewable prenatal nutritional supplement of claim 5, wherein the supplement comprises about 8–40 milligrams of dimethyl polysiloxane.

7. The chewable prenatal nutritional supplement of claim 5, wherein the supplement comprises about 8–15 milligrams of dimethyl polysiloxane.

8. The chewable prenatal nutritional supplement of claim 1, wherein the alkyl polysiloxane is simethicone USP.

9. The chewable prenatal nutritional supplement of claim 1, wherein the alkyl polysiloxane is present in a granulated form.

10. The chewable prenatal nutritional supplement of claim 1, wherein the supplement further comprises chewable tablet base.

11. The chewable prenatal nutritional supplement of claim 10, wherein the base comprises a primary ingredient selected from the group consisting of mannitol, sucrose, sorbitol, dextrose, compressible cellulose, compressible honey, compressible molasses, compressible sugar, and lactose.

12. The chewable prenatal nutritional supplement of claim 11, wherein the supplement has an interior that is noticeably softer than its exterior.

13. The chewable prenatal nutritional supplement of claim 10, wherein the base comprises an agglomerate which comprises 90%–99% by weight of carbohydrate-based material selected from the group consisting of dextrose, a combination of dextrose monohydrate and maltodextrin, fructose, a combination of fructose and maltodextrin, sucrose, a combination of sucrose and maltodextrin, maltose, a combination of maltose and maltodextrin, mannitol, xylose, and a combination of xylose and maltodextrin; and 1%–10% by weight of a water soluble binder selected from the group consisting of maltodextrin, corn syrup solids, dextrose, sucrose, poly(vinylpyrrolidone), and cooked starch paste.

14. The chewable prenatal nutritional supplement of claim 13, wherein the carbohydrate-based material is selected from the group consisting of:
dextrose monohydrate, a combination of dextrose monohydrate and maltodextrin, fructose, dextrose, mannitol, a combination of fructose and maltodextrin, sucrose, a combination of sucrose and maltodextrin, maltose, a combination of maltose and maltodextrin, xylose, and a combination of xylose and maltodextrin.

15. The chewable prenatal nutritional supplement of claim 13, wherein the water soluble binder is maltodextrin.

16. A chewable prenatal nutritional supplement in a unit dosage form which comprises a prenatally relevant amount of at least one vitamin or mineral and an alkyl polysiloxane, and wherein the unit dosage form comprises
(a) about 0.1–2.0 milligrams of folic acid, or a pharmaceutically acceptable salt form thereof;
(b) about 100–800 International Units (I.U.) of vitamin $D_3$;
(c) about 100–4000 I.U. of beta carotene or another pharmaceutically acceptable form of vitamin A;
(d) about 0.2–8 milligrams of vitamin $B_1$;
(e) about 0.5–10 milligrams of vitamin $B_2$;
(f) about 2–200 milligrams of vitamin $B_6$;
(g) about 2–20 micrograms of vitamin $B_{12}$;
(h) about 1–200 I.U. of vitamin E;
(i) about 20–200 milligrams of vitamin C in the form of ascorbic acid and/or a pharmaceutically acceptable salt thereof;
(j) about 5–40 milligrams of niacinamide or an equivalent molar amount of niacin;
(k) about 1–100 milligrams of elemental iron in the form of a pharmaceutically acceptable iron compound.

17. The chewable prenatal nutritional supplement of claim 16 wherein the unit dosage form comprises
(a) at least about 1.0 milligram of folic acid, or a pharmaceutically acceptable salt form thereof;
(b) at least about 400 I.U. of vitamin $D_3$;
(c) at least about 1000 I.U of beta carotene;
(d) at least about 2 milligrams of vitamin $B_1$;
(e) at least about 3 milligrams of vitamin $B_2$;
(f) at least about 10 milligrams of vitamin $B_6$;
(g) at least about 12 micrograms of vitamin $B_{12}$;
(h) at least about 11 I.U. of vitamin E;
(i) at least about 120 milligrams of vitamin C in the form of ascorbic acid or a pharmaceutically acceptable salt thereof;
(j) at least about 20 milligrams of niacinamide or an equivalent molar amount of niacin; and
(k) at least about 15 milligrams, of elemental iron, in the form of a pharmaceutically acceptable iron compound.

18. The chewable prenatal nutritional supplement of claim 16 wherein the unit dosage form comprises (a) about 1.25 milligrams of folic acid;
(b) about 440 I.U. of vitamin $D_3$;
(c) about 1100 I.U. of beta carotene;
(d) about 2.4 milligrams of vitamin $B_1$;
(e) about 3.5 milligrams of vitamin $B_2$;
(f) about 12 milligrams of vitamin $B_6$;
(g) about 14.4 milligrams of vitamin $B_{12}$;
(h) about 13.2 I.U. of vitamin E;
(i) about 132 milligrams of vitamin C;
(j) about 22 milligrams of niacinamide; and
(k) about 29 milligrams of elemental iron.

19. A method of making a chewable prenatal nutritional supplement, the method comprising mixing a prenatally relevant amount of folic acid and a prenatally relevant amount of iron with an alkyl polysiloxane to yield a mixture and incorporating the mixture into an orally administrable dosage form, and wherein the supplement is substantially free of calcium.

20. The method of claim 19, wherein the dosage form is a chewable tablet.

21. The method of claim 19, wherein folic acid is mixed with the alkyl polysiloxane to form the mixture.

22. The method of claim 19, wherein an iron compound is mixed with the alkyl polysiloxane to form the mixture.

23. The method of claim 19, wherein the alkyl polysiloxane is dimethyl polysiloxane.

24. The method of claim 23, wherein the alkyl polysiloxane is simethicone USP.

25. The method of claim 24, wherein the alkyl polysiloxane is a granulated form of simethicone USP.

26. A method of making a chewable prenatal nutritional supplement, the method comprising mixing a prenatally relevant amount of at least one vitamin or mineral with an alkyl polysiloxane to yield a mixture and incorporating the mixture into an orally administrable dosage form, wherein the mixture is formed by mixing the alkyl polysiloxane with (a) folic acid;
(b) vitamin $D_3$;
(c) vitamin A;
(d) vitamin $B_1$;
(e) vitamin $B_2$;
(f) vitamin $B_6$;
(g) vitamin $B_{12}$;
(h) vitamin E;
(i) vitamin C;
(j) one of niacinamide and niacin; and
(k) an iron compound.

27. The method of claim 26, wherein at least one of the iron compound, vitamin $B_1$, vitamin $B_2$, vitamin $B_6$, vitamin $B_{12}$, niacin, and niacinamide is coated.

28. A method of alleviating a nutritional disorder in a human, the method comprising administering to the human a chewable prenatal nutritional supplement which comprises a prenatally relevant amount of folic acid, a prenatally relevant amount of iron, and about 1–100 milligrams of an alkyl polysiloxane, wherein the amount of the alkyl polysiloxane is less than one weight percent of the supplement and wherein the supplement is substantially free of calcium.

29. In a method of alleviating a nutritional disorder in a human by administering a chewable prenatal nutritional supplement comprising a prenatally relevant amount of folic acid and a prenatally relevant amount of iron to the human, the improvement comprising incorporating about 1–100 milligrams of an alkyl polysiloxane in the supplement, wherein the amount of the alkyl polysiloxane is less than one weight percent of the supplement, and wherein the supplement is substantially free of calcium.

* * * * *